(12) United States Patent
Savchenkov et al.

(10) Patent No.: US 7,440,651 B1
(45) Date of Patent: Oct. 21, 2008

(54) SINGLE MODE WHISPERING-GALLERY-MODE RESONATOR

(75) Inventors: Anatoliy Savchenkov, Glendale, CA (US); Dmitry V. Strekalov, Arcadia, CA (US); Andrey B. Matsko, Pasadena, CA (US); Vladimir Ilchenko, Arcadia, CA (US); Lutfollah Maleki, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 47 days.

(21) Appl. No.: 11/282,160

(22) Filed: Nov. 17, 2005

Related U.S. Application Data

(60) Provisional application No. 60/628,725, filed on Nov. 17, 2004.

(51) Int. Cl.
*G02B 6/26* (2006.01)
(52) U.S. Cl. ............................. 385/28; 385/27; 385/29; 385/32
(58) Field of Classification Search ................ 385/32
See application file for complete search history.

(56) References Cited

U.S. PATENT DOCUMENTS

| | | | |
|---|---|---|---|
| 5,204,640 A | 4/1993 | Logan | |
| 5,220,292 A | 6/1993 | Bianchini et al. | |
| 5,723,856 A | 3/1998 | Yao et al. | |
| 5,751,747 A | 5/1998 | Lutes et al. | |
| 5,777,778 A | 7/1998 | Yao | |
| 5,917,179 A | 6/1999 | Yao | |
| 5,929,430 A | 7/1999 | Yao et al. | |
| 5,985,166 A | 11/1999 | Unger et al. | |
| 6,080,586 A | 6/2000 | Baldeschwieler et al. | |
| 6,178,036 B1 | 1/2001 | Yao | |
| 6,203,660 B1 | 3/2001 | Unger et al. | |
| 6,389,197 B1 | 5/2002 | Iltchenko et al. | |
| 6,417,957 B1 | 7/2002 | Yao | |
| 6,473,218 B1 | 10/2002 | Maleki et al. | |
| 6,476,959 B2 | 11/2002 | Yao | |
| 6,487,233 B2 | 11/2002 | Maleki et al. | |
| 6,488,861 B2 * | 12/2002 | Iltchenko et al. | .............. 216/24 |
| 6,490,039 B2 | 12/2002 | Maleki et al. | |
| 6,535,328 B2 | 3/2003 | Yao | |
| 6,567,436 B1 | 5/2003 | Yao et al. | |
| 6,580,532 B1 | 6/2003 | Yao et al. | |
| 6,594,061 B2 | 7/2003 | Huang et al. | |
| 6,762,869 B2 | 7/2004 | Maleki et al. | |
| 6,795,481 B2 | 9/2004 | Maleki et al. | |
| 6,798,947 B2 | 9/2004 | Iltchenko | |
| 6,853,479 B1 | 2/2005 | Ilchenko et al. | |

(Continued)

FOREIGN PATENT DOCUMENTS

WO 2005055412 6/2005

OTHER PUBLICATIONS

Logan, et al.; Stabilization of Oscillator Phase Using a Fiber-Optic Delay-Line; 1991; 45th Annual Symposium on Frequency Control; pp. 508-512.

(Continued)

*Primary Examiner*—M. R. Connelly-Cushwa
(74) *Attorney, Agent, or Firm*—Fish & Richardson P.C.

(57) ABSTRACT

Whispering-gallery-mode (WGM) resonators configured to support only a single whispering gallery mode.

22 Claims, 8 Drawing Sheets

U.S. PATENT DOCUMENTS

| | | | |
|---|---|---|---|
| 6,871,025 | B2 | 3/2005 | Maleki et al. |
| 6,873,631 | B2 | 3/2005 | Yao et al. |
| 6,879,752 | B1 | 4/2005 | Ilchenko et al. |
| 6,901,189 | B1 | 5/2005 | Savchenkov et al. |
| 2002/0044739 | A1* | 4/2002 | Vahala et al. ............. 385/30 |
| 2002/0081055 | A1 | 6/2002 | Painter et al. |
| 2004/0100675 | A1 | 5/2004 | Matsko et al. |
| 2004/0218880 | A1 | 11/2004 | Matsko et al. |
| 2004/0240781 | A1 | 12/2004 | Savchenkov et al. |
| 2005/0017816 | A1 | 1/2005 | Ilchenko et al. |
| 2005/0074200 | A1 | 4/2005 | Savchenkov et al. |
| 2005/0123306 | A1 | 6/2005 | Ilchenko et al. |
| 2005/0128566 | A1 | 6/2005 | Savchenkov et al. |

OTHER PUBLICATIONS

L.E. Myers, et al.; Quasi-phase-matched optical parametric oscillators in bulk periodically poled $LiNbO_3$; Nov. 1995; J.Opt. Soc. Am. B/vol. 12, No. 11, pp. 2102-2116.

X. Steve Yao, et al.; Converting Light into Spectrally Pure Microwave Oscillation; Apr. 1996; Optics Letters, vol. 21, No. 7; pp. 483-485.

H. Ito, et al.; InP/InGaAs uni-travelling-carrier photodiode with 310 GHz receiver; Oct. 12, 2000; Electronics Letters, vol. 36, No. 21; pp. 1809-1810.

V. Ilchenko, et al.; Sub-Micro Watt Photonic Microwave Receiver; Nov. 2002; IEEE Photonics Technology Letters, vol. 14, No. 11; pp. 1602-1604.

* cited by examiner

Cladding, Core, Cladding, Cladding, Core

FIG. 10B
Multimode WGM Resonator

FIG. 10C
Single-Mode WGM Resonator

Protruded Belt fundamental mode
nonfundamental mode

SINGLE MODE WHISPERING-GALLERY-MODE RESONATOR

This application claims the benefit of U.S. Provisional Application No. 60/628,725 entitled "Single Mode Dielectric Whispering Gallery Mode Resonator" and filed Nov. 17, 2004.

FEDERALLY SPONSORED RESEARCH OR DEVELOPMENT

The invention described herein was made in the performance of work under a NASA contract, and is subject to the provisions of Public Law 96-517 (35 U.S.C. 202) in which the Contractor has elected to retain title.

BACKGROUND

This application relates to resonators for electromagnetic signals such as optical resonators and microwave resonators.

An optical material such as a dielectric material may be shaped to construct an optical whispering-gallery-mode ("WGM") resonator which supports a special set of resonator modes known as whispering gallery ("WG") modes. These WG modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the equator of the sphere. The resonator dimension is generally much larger than the wavelength of light so that the optical loss due to the finite curvature of the resonators is small. As a result, a high quality factor, Q, e.g., greater than $10^9$, may be achieved in such resonators. Hence, optical energy, once coupled into a whispering gallery mode, can circulate within the WGM resonator with a long photon life time. Such hi-Q WGM resonators may be used in many optical applications, including optical filtering, optical delay, optical sensing, lasers, and opto-electronic oscillators.

SUMMARY

This application describes whispering gallery mode resonators that are structured to spatially confine electromagnetic energy in a single whispering gallery mode. In one implementation, an exemplary device is described to include a cylindrical rod of a material comprising a protruded belt region symmetric around a longitudinal axis of the cylindrical rod to form an optical resonator. The height of the protruded belt region along the longitudinal axis is set to be sufficiently small so that the protruded belt region supports a single whispering gallery mode circulating around the protruded belt region.

In another implementation, an exemplary device is described to include a whispering-gallery-mode resonator shaped symmetrically around a symmetry axis and having an equator in a circular cross section of the resonator that is perpendicular to the symmetry axis. The resonator is shaped to comprise a protruded belt region at the equator and a height of the protruded belt region along the symmetry axis is set between a first height threshold and a second height threshold to support energy in a single whispering gallery mode. The protruded belt region does not support any whispering gallery mode when the height of the protruded belt region is less than the first height threshold, and the protruded belt region supports at least two whispering gallery modes when the height of the protruded belt region is greater than a second height threshold.

These and other implementations and their properties, operations and fabrications are described in greater detail in the attached drawings, the detailed description and the claims.

DETAILED DESCRIPTION

Most reported WGM resonators are multi-mode WGM resonators that simultaneously support multiple WG modes. The optical spectra of multi-mode WGM resonators have multiple peaks from different modes. Each WG mode manifests as a series or family of periodic resonance peaks in the spectrum of the resonator. When multiple WG modes are present, the resonator has a spectrum with overlapped different families of periodic resonance peaks. For many optical applications, such multi-mode spectra are not desirable. The high mode densities of multimode spherical and cylindrical WGM resonators are limited in their applications in optical science and technology. Light sent into these multimode WGM resonators occupies a large multiplicity of overlapping and possibly interacting modes, thus complicating device performance and limiting the accuracy of physical measurements. A single mode WGM resonator is desirable in may applications. For example, a resonant optical modulator many be preferably configured to have only one fundamental spectrum to maximize the modulator efficiency. Also, an optical WGM resonator filter may be preferably configured to have a single resonance mode to achieve optical filtering. A single mode WGM resonator can produce a clean spectrum with equidistant peaks and can be useful in the above and a wide range of optical applications. Various optical dielectric materials may be used to construct single mode WGM resonators described in this application, such as crystal materials and non-crystal materials. Some examples of suitable dielectric materials include fused silica materials, glass materials, lithium niobate materials, and calcium fluoride materials.

WGM resonators are axially or cylindrically symmetric around a symmetry axis around which the WG modes circulate in a circular path or the equator. The exterior surface of such a resonator is smooth and provides spatial confinement to light around the circular plane to support one or more WG modes. The exterior surface may be curved toward the symmetry axis to spatially confine the light along the symmetry axis. A single mode WGM resonator may be shaped symmetrically around a symmetry axis and has a protruded belt region to form a circular path to confine light in a single MG mode. The exterior surface of the protruded belt region may be any suitable geometrical shape such as a flat surface or a curved surface. Such a single-mode WGM resonator may be configured in any suitable physical size for a given wavelength of light. In many applications, miniaturized single-mode WGM resonators may be preferred and one or more miniaturized single-mode MGM resonators may be integrated on a substrate.

As one example, a single-mode WGM resonator may be constructed from a cylindrical rod of an optical material comprising a protruded belt region symmetric around a longitudinal axis of the cylindrical rod (i.e., the symmetry axis) to form an optical resonator. The height of the protruded belt region along the longitudinal axis is set to be sufficiently small so that the protruded belt region supports a single whispering gallery mode circulating around the protruded belt region. The height of the protruded belt region has a lower threshold below which no WG mode exists and a higher threshold above which two or more WG modes co-exist. Therefore, the height of the protruded belt region is set between the above two thresholds to maintain a single WG mode.

Figure 1:
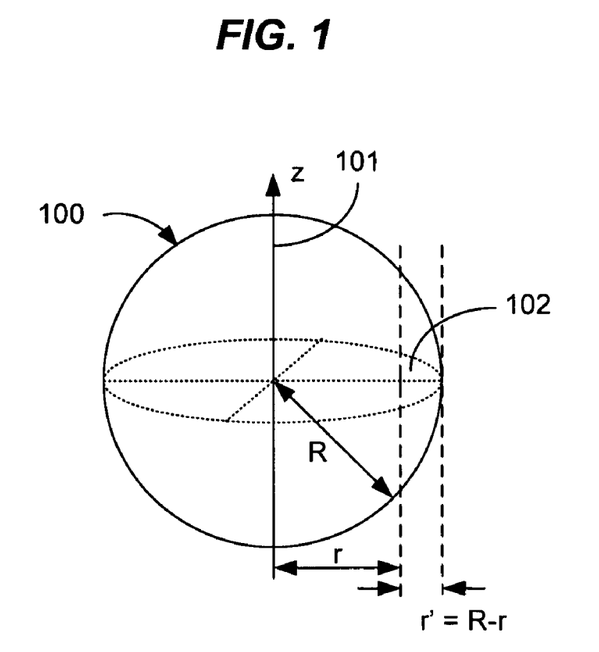
FIGS. 1, 2 and 3 illustrate three geometries of whispering gallery mode resonators.
Figure 2:
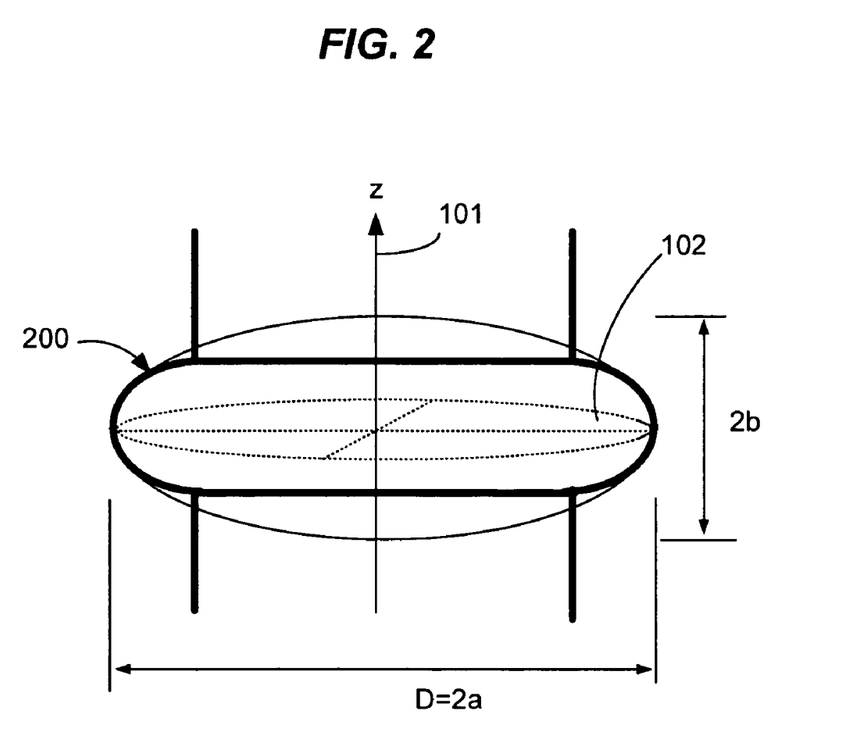
Figure 3:
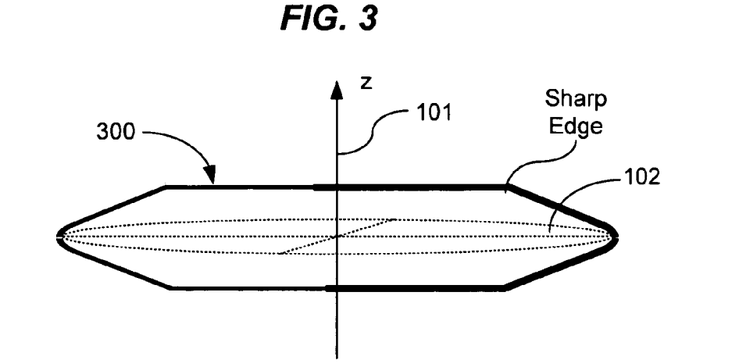

The profile of the exterior surface of the protruded belt region may be selected from a number of geometrical shapes, e.g., spherical, spheriodal, flat and others. FIGS. 1, 2, and 3 illustrate three exemplary geometries of curved exterior surfaces for implementing single mode WGM resonators.

FIG. 1 shows a spherical WGM resonator 100 which is a solid dielectric sphere. The sphere 100 has an equator in the plane 102 which is symmetric around the z axis 101. The circumference of the plane 102 is a circle and the plane 102 is a circular cross section. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheriodal microresonator 200. This resonator 200 may be formed by revolving an ellipse (with axial lengths a and b) around the symmetric axis along the short elliptical axis 101 ($z$). Therefore, similar to the spherical resonator in FIG. 1, the plane 102 in FIG. 2 also has a circular circumference and is a circular cross section. Different from the design in FIG. 1, the plane 102 in FIG. 2 is a circular cross section of the non-spherical spheroid and around the short ellipsoid axis of the spheroid. The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. More specifically, the geometry of the cavity in the plane in which Z lies such as the zy or zx plane is elliptical. The equator plane 102 at the center of the resonator 200 is perpendicular to the axis 101 ($z$) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola. Note that the plane 102 in FIG. 3 is a circular cross section and a WG mode circulates around the circle in the equator.

The above three exemplary geometries in FIGS. 1, 2, and 3 share a common geometrical feature that they are all axially or cylindrically symmetric around the axis 101 ($z$) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
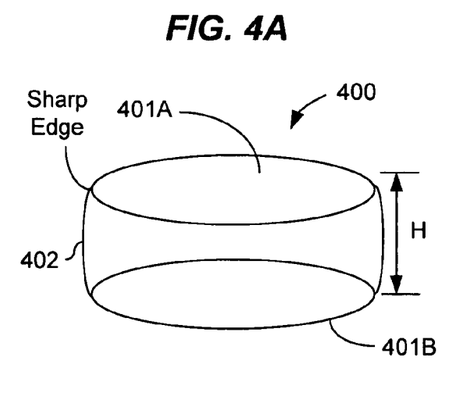
FIGS. 4A and 4B show examples of a disk-shaped and ring-shaped whispering gallery mode resonators.
Figure 4B:
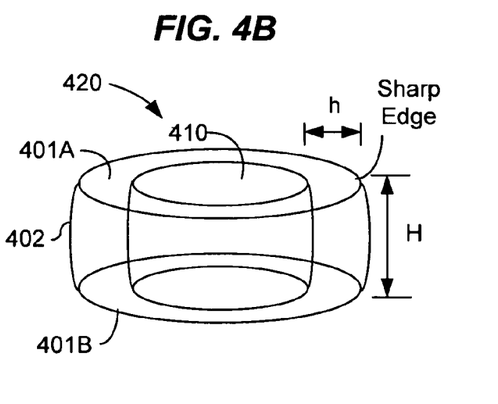

FIGS. 4A and 4B show a disk-shaped WGM resonator 400 and a ring-shaped WGM resonator 420, respectively. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 3, 4A, and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

Figure 5A:
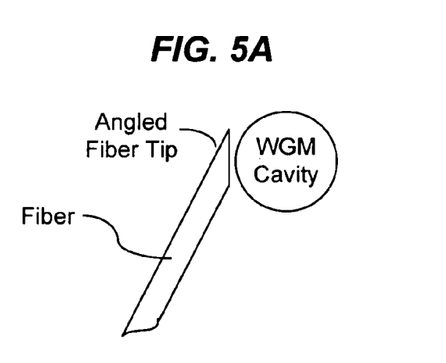
FIGS. 5A and 5B illustrate two light coupling configurations for whispering gallery mode resonators.
Figure 5B:
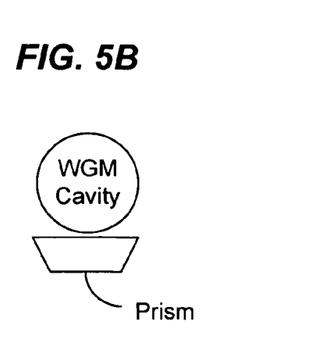

An optical coupler is generally used to couple optical energy into or out of the WGM resonator by evanescent coupling. FIGS. 5A and 5B show two exemplary optical couplers engaged to a WGM resonator. The optical coupler may be in direct contact with or separated by a gap from the exterior surface of the resonator to effectuate the desired critical coupling. FIG. 5A shows an angle-polished fiber tip as a coupler for the WGM resonator. A waveguide with an angled end facet, such as a planar waveguide or other waveguide, may also be used as the coupler. FIG. 5B shows a micro prism as a coupler for the WGM resonator. Other evanescent couplers may also be used, such as a coupler formed from a photonic bandgap material.

Single mode WGM resonators described in this application use spatial protruded structures to confine light into a single-WG mode. To a certain extent and as one way to assist the understanding of the underlying mechanism, such spatial confinement in single mode WGM resonators may be analogous to the optical confinement by the optical cladding in well-known single mode fibers. Single mode fibers are usually fabricated with a core having slightly higher refractive index than the refractive index of the cladding so only one mode in a chosen optical frequency range can survive and other modes are suppressed.

Figure 6A:
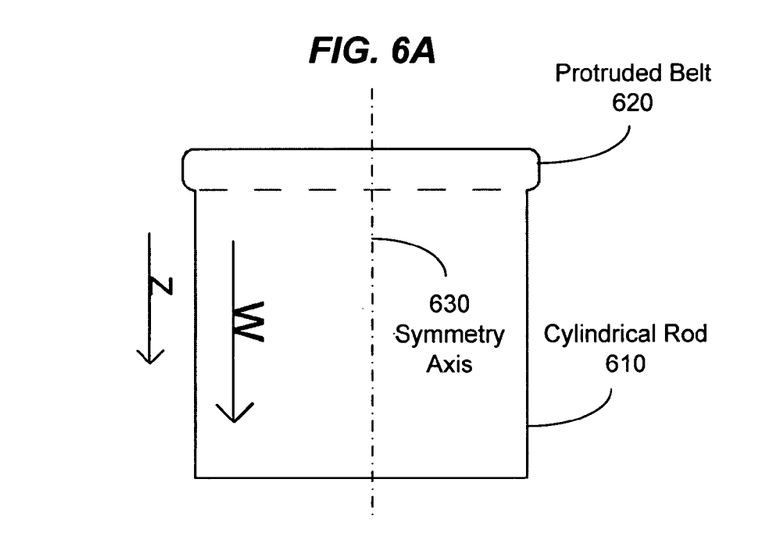
FIG. 6A shows spatial confinement of light along the symmetry axis of a whispering gallery mode that leads to a single mode resonator.

FIG. 6A illustrates a WGM resonator formed in a protruded belt region 620 on a cylindrical rod 610. The rod 610 has a symmetry axis 630. A simple WGM resonator can be formed in the rod 610 with the straight side cylindrical surface. Such a WGM resonator supports multiple WG modes that circulate around the cylindrical surface in a circular plane that is centered at an intersection with the symmetry axis 630. The protruded belt region 620 introduces additional spatial confinement that is not available from the straight side cylindrical surface of the rod 610. For example, in one aspect, the protruded belt region 620 adds one more virtual dimension w along the symmetry axis 630 (z) to the resonator's geometry and provides an effective optical cladding when WGM resonators are treated as three dimensional waveguides with specific refractive index distributions.

Figure 6B:
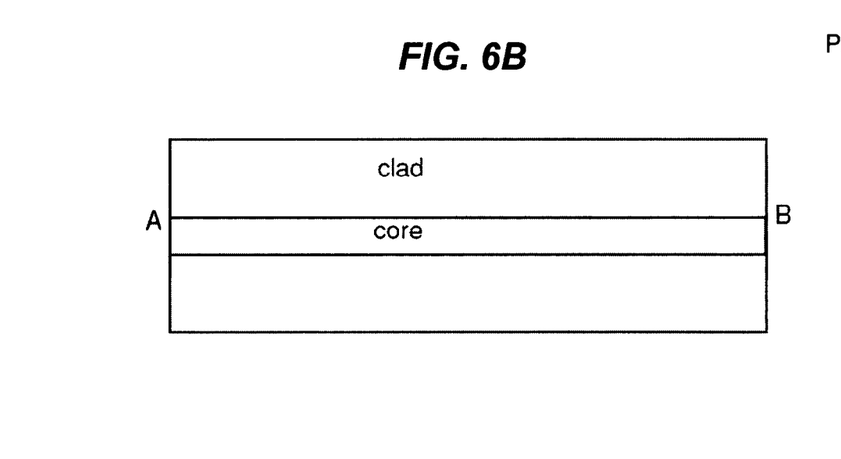
FIG. 6B shows the optical core and cladding in a fiber as an analogy to the spatial confinement in the whispering gallery mode resonator in FIG. 6A.

As an analogy, consider a WGM resonator in a two dimensional, planar waveguide where light is being transferred from point a to point b as in a fiber shown in FIG. 6B. The light traveling around the axis of the real resonator experiences a delay in the planar waveguide. This delay is determined by the refractive index and the [a,b] distance. Next, let us introduce to the WGM resonator in FIG. 6A an effective index of refraction $\bar{n}(z)$ that depends on the coordinate z. The refractive index of such a waveguide depends not only on refractive index n of the actual resonator (n=1.45 in silica, for instance) but also on the local radius R of the resonator in FIG. 6A as follows:

$$\bar{n}(z) = n\left(1 - \frac{y(z)}{R}\right).$$

where the function y(z) is dictated by the geometrical shape of the protruded belt region 620. Three examples for the protruded belt region 620 are (1) the protruded belt region 620 is the equator region of a sphere, (2) the protruded belt region 620 is the equator region of a torus or spheroid and (3) the protruded belt region 620 is a disk with a straight exterior side surface. In the example (1), $$y(z) = \frac{z^2}{2 \cdot R},$$

which can be described as a regular grin lens when the pitch is equal to one. Such a waveguide can be a multimode resonator without the specific configuration of the belt region described below. In the example (2) for the torus shape, $$y(z) = F^2 \frac{z^2}{2R},$$

where F is a linear scaling factor determined by the specific torus shape. Again, this waveguide can be a multimode resonator without the specific configuration of the belt region described below. In the example (3), we have just the same high pitch waveguide but with the walls and the waveguide supports multiple modes. The waveguide can be configured as a single mode waveguide if the disk thickness is reduced to about $\lambda/2$ where $\lambda$ is the wavelength of the light to be confined.

Figure 7:
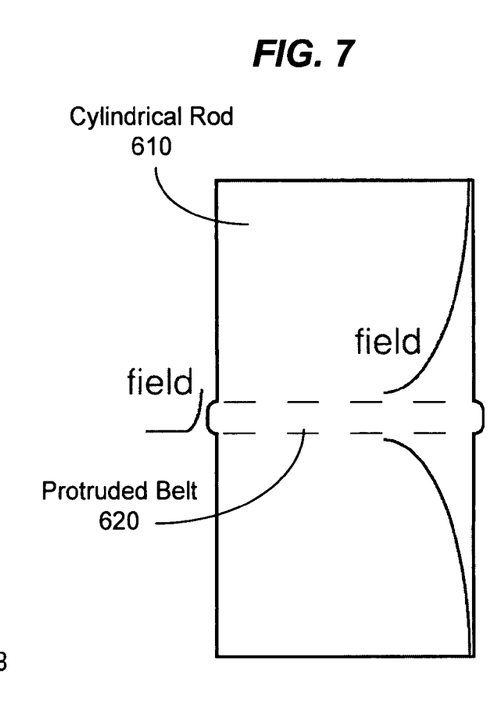
FIG. 7 illustrates one example of a single mode WGM resonator made from a rod that has a protruded belt region to support the single WG mode.

As a specific example, consider specifically a waveguide with $\Delta\bar{n}=2\times10^{-3}$ and core width of 9 μm for supporting a single mode at the optical wavelength of 1550 nm. FIG. 7 shows a WGM resonator formed in the protruded belt region 620 in the rod 610 that produce the above waveguide parameters, thus mimicking a single mode fiber. The depth of the belt region 620 along the symmetry axis of the rod 610 can be estimated as $d=R\Delta\bar{n}$ where R is the radius of the rod 610. Such a geometry of the resonator has a number of features. First, the virtual refractive index step $\Delta\bar{n}$ does not depend on the refractive index of the material of the rod 610 but can be adjusted by the shape and dimension of the belt region 620. Second, for resonators made out of a crystal or other material with a high refractive index, the virtual refractive index step $\Delta\bar{n}$ does not depend on the coating of the external surface of the resonator. Third, the resonator in FIG. 7 has two kinds of evanescent fields at the air-dielectric material boundary and the belt-rod boundary, respectively.

Hence, in the designs shown in FIGS. 6A and 7, the virtual refractive index along the symmetry axis of the rod may be manipulated by controlling the shape and dimension of the protruded belt region in design and fabrication. This manipulation changes a scale of the evanescent field along the symmetry axis of the rod and the resultant WGM resonator may be designed to provide efficient coupling specifically tailored for a particular optical field. For example, an evanescent field with a spatial extent of 10 μm or longer may be coupled using such a resonator along the symmetry axis. This makes full contact critical coupling more rigid and allows for easy tuning of the coupling efficiency. This control of the spatial confinement of the light along the symmetry axis direction of the resonator to achieve a single mode operation in the WGM resonator is analogous to the spatial confinement in a single mode fiber via the index variation from the fiber core to the fiber cladding.

Figure 8:
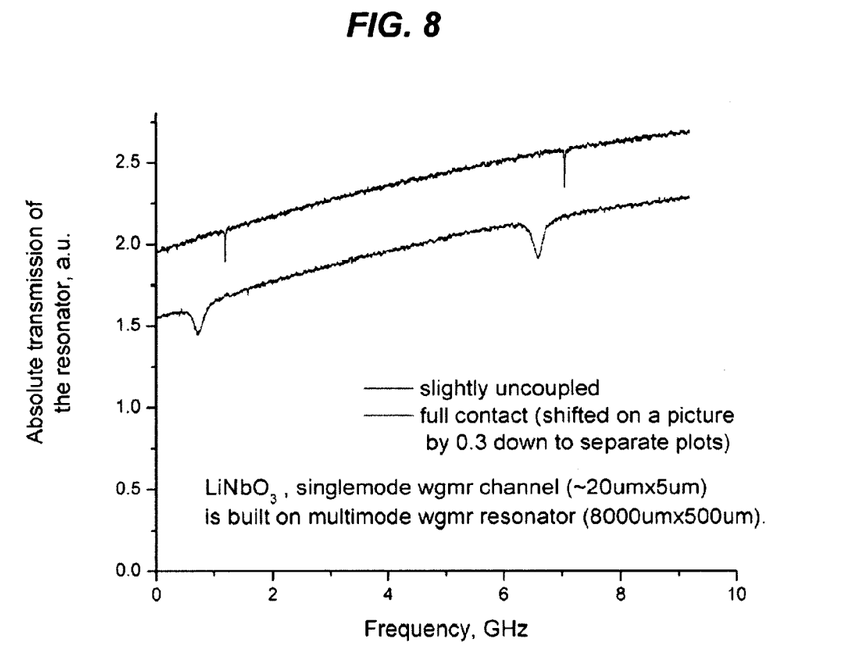
FIGS. 8 and 9 show measured spectra of two exemplary single mode WGM resonators.

As an example of a single mode WGM resonator, a lithium niobate rod of 8000 μm diameter, which is a multi-mode WGM resonator, can be processed as a single mode WGM resonator by having a protruded belt region of 5 μm in depth along the symmetry axis of the rod and 9 μm in width along the radial direction. A crystal-made single mode WGM resonator may be fabricated as a thick disk with a flat rim. The flat rim is fabricated to have a protruded bump as the protruded belt region for the single-mode operation. FIG. 6A illustrates an example. The fabrication may be achieved by using, e.g., lathe and specifically shaped diamond cutters. FIG. 8 shows the measured optical spectra of a lithium niobate single-mode WGM resonator at the optical wavelength of 1550 nm under two different optical coupling conditions.

Figure 9:
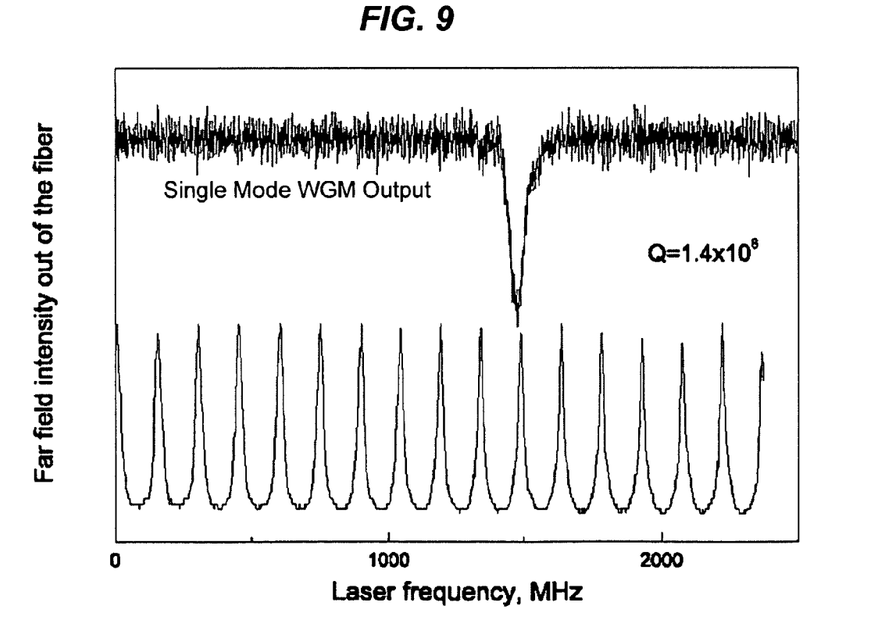

As another example of a single mode WGM resonator, a fused silica rod of 125 μm in diameter is fabricated with a protruded belt region in the configuration similar to what is illustrated in FIG. 7 as a single mode WGM resonator. FIG. 9 shows the measured output spectrum of this single mode WGM resonator (top trace) in comparison with a Fabry-Perot etalon spectrum (bottom trace) as a frequency reference.

The technique outlined above for achieving a single mode operation in a WGM resonator generates an effective refractive index contrast by shaping the geometry of a WGM resonator. With this technique single and multiply-coupled WGM resonators can be designed for a wide variety of applications. Some examples of the applications include observing phase transitions in liquids, monitoring microfluidic flow, measuring the chemical composition of dilute solutions, and creating devices such as nonlinear oscillators, high order filters, delay lines, modulators, and other devices for use in fundamental studies in quantum optics. The following sections describe detailed analysis on the designs for the protruded belt region in a single mode WGM resonator. Once again, the analogy to single mode fibers is used to assist the understanding the function and operation of the protruded belt region in the described single mode WGM resonators.

Figure 10A:
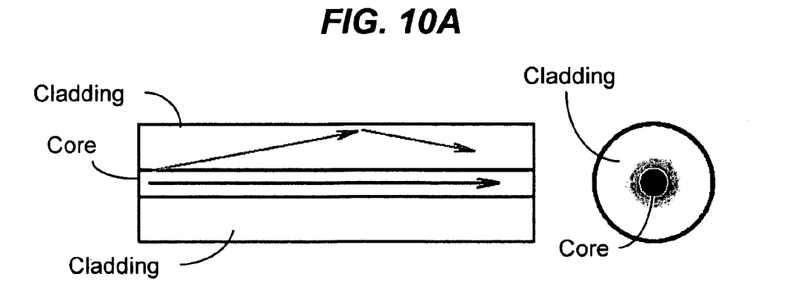
FIG. 10A shows the waveguide structure of an optical fiber and mode localization by the spatial change of index from the fiber core to the fiber cladding.

Referring to FIG. 10A, a homogeneous dielectric waveguide becomes single-mode when the frequency of the propagating light is close to its cut-off frequency. This means that the thickness of the waveguide approaches the half-wavelength of light in the host material of the waveguide. In actual devices, it may be impractical to fabricate a single-mode optical fiber by decreasing the fiber diameter. Instead, the single mode operation is ensured by the specially selected radial profile of the refractive index of the fiber material. The core of the fiber has a larger index of refraction than the cladding material that surrounds it. The difference of the indices is small, so only one mode propagates inside the core, while the others decay into the cladding. For instance, the condition for the single mode operation of a planar waveguide is $$d_{co} < \frac{\lambda}{2\sqrt{\Delta\epsilon}},$$

where $d_{co}$ is thickness of the core, $\lambda$ is wavelength of light in vacuum, and $\Delta\epsilon$ is the difference between the susceptibilities of the core and the cladding material, respectively. As a result, the core may have a reasonably large diameter. Note that the core of a single-mode fiber is a multi-mode fiber if the cladding is removed.

Figure 10B:
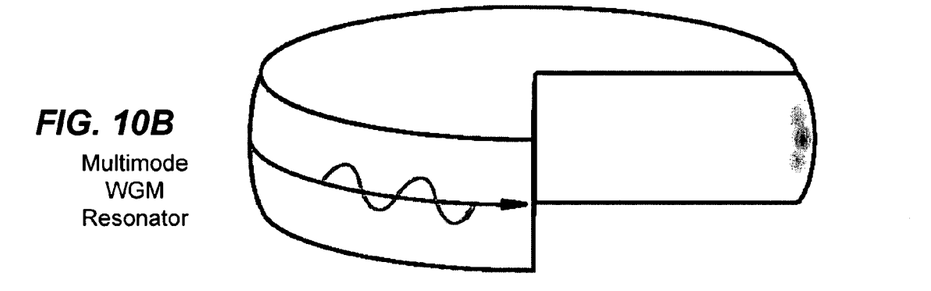
FIG. 10B shows a multimode WGM resonator where the mode localization is achieved by the spatial confinement via the resonator shape while the index of the resonator material may be a constant.

Turning to FIG. 10B, consider a multimode WGM resonator as a multi-mode gradient waveguide. The resonator becomes an ideal single-mode-family resonator only if the waveguide is sufficiently thin to suppress all other modes except one single mode. Following this approach the WGM resonator should be designed as an approximately half-wavelength-thick torus to support a single mode family. Recent experiments confirmed this conclusion.

There is another, nontrivial, approach to the problem based on the analogy with a single-mode optical fiber. We show here that a WGM resonator made of any transparent material with any size can be transformed into a single-mode resonator if the appropriate geometrically defined core and cladding are developed.

To show that WGM modes can be described using a waveguide formalism, we start with the usual wave equation for the light in the WGM resonator:

$$\Delta x(\Delta x E) = -k^2 \epsilon(r) E = 0,$$

where $k=w/c$ is the wave number, $\epsilon(r)$ is the coordinate dependent dielectric susceptibility, E is the electric field of the mode, and r is the radius vector.

Figure 10C:
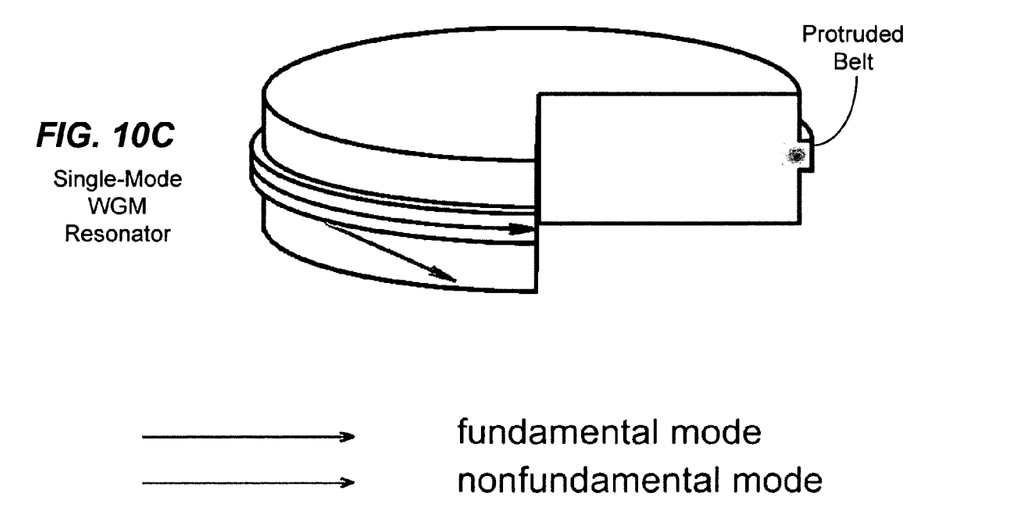
FIG. 10C shows a single-mode WGM resonator having a protruded belt region.

Higher-order WGMs, i.e., modes with the wavelength much smaller than the resonator size of both TE and TM kinds, are localized in the vicinity of the equator of the WGM resonator. For this problem, cylindrical coordinates can be conveniently used. Assume that the resonator radius changes as $$R = R_0 + L(z) \quad (R_0 \gg |L(z)|)$$

in the vicinity of the equator, where $R_0$ is the radius of the equator of the WGM resonator without accounting for the protruded belt region at the equator and $L(z)$ is the width of the protruded belt region along the radial direction. Applying the technique of separation of variables, and the above wave equation for the TE mode family can be written as $$\frac{\partial^2 E}{\partial r^2} + \frac{\partial^2 E}{\partial z^2} + \left[ k^2 \epsilon \left( 1 + 2\frac{L(z)}{R_0} \right) - \frac{\nu^2}{r^2} \right] E = 0,$$

where $\nu$ is the angular momentum number of the mode (assuming $\nu \gg 1$), $E(r, z)$ is the scalar field amplitude, $\epsilon$ in the susceptibility of resonator material. This equation is similar to the gradient waveguide equation. Modes of a spherical WGM resonator coincide with modes of a gradient waveguide with parabolic distribution of refractive index in the z direction. Hence, it is the geometry of the surface that should be modified to produce an ideal single-mode WGM resonator. A "core" for the WGM "waveguide" can be realized by the proper design of the resonator surface in the vicinity of the equator. The rest of the resonator body plays the role of the "cladding". FIG. 10C illustrates this design of the single mode WGM resonator.

The spatial confinement along the symmetry axis (the z direction) is designed to allow a single WG mode in the protruded belt region while suppressing all other WG modes that would coexist in absence of the protruded belt region. The thickness of the protruded belt region along the z direction cannot be too small that all WGM modes are suppressed on one hand and cannot be too big, on the other hand, to allow for more than one WGM mode. These two conditions present two threshold values for the thickness of the protruded belt region along the z direction and the thickness of the protruded belt region is designed to be between the two thresholds. The specific values for the two thresholds depend on the geometry of the exterior surface of the protruded belt region, i.e., $L(z)$.

As a simple example, consider a resonator having a cylindrical drum with a radius of $R_0$ and a small, ring like protrusion, $L(z)=L_0$ is a constant for $d \geq z \geq 0$ on its exterior surface. It is further assumed that the drum's effective susceptibility does not depend on the z coordinate and is equal to $\epsilon$. The effective susceptibility of the ring, $\epsilon(1+2L_0/R_0)$, is slightly larger. Therefore, the ring is the core that confines the light in the z direction, while the drum is the cladding. The condition for "single mode" operation of the resonator is:

$$1 > \frac{d}{\lambda} \sqrt{\frac{2 L_0 \epsilon}{R_0}} > \frac{1}{2}.$$

This condition defines the lower and upper thickness or height threshold values for the protruded belt region under the single mode operation and stays valid for a resonator with an arbitrary radius. Both the width and the height of the ring can be much larger than the wavelength of light. The ratio $L_0/R_0$ plays the same role as the ratio $\Delta\epsilon/\epsilon$ in an optical fiber.

To demonstrate the single-mode operation experimentally, a resonator was built by using a 2-step fabrication process.

The first step is a diamond turning process, which employs computer control of a precision lathe. In our diamond turning setup we used an air bearing to achieve the required stiffness and repeatability of workpiece rotations. A commercial brushless motor and a magnetic clutch were used to rotate the bearing. The structures obtained at this step are engineered to about 40 nm precision and have optical Q factors of up to $10^7$. If higher Q factors are needed, additional optical polishing must be performed. This polishing step naturally leads to the modification of the structure initially obtained by the diamond turning process.

The optical polishing is performed by application of a polycrystalline diamond slurry. The optimal size and type of the grains as well as the speed of rotation depend on the material being polished. The optical Q factor of the resonators after the second fabrication step can be limited by contributions from bulk losses, radiation leakage, and surface losses. We have shown that bulk losses are the main restriction on the quality factor. Ultimately, $CaF_2$ resonators could have Q factors of the order of $10^{14}$; practically $Q=2\times10^{10}$ was realized.

Figure 11:
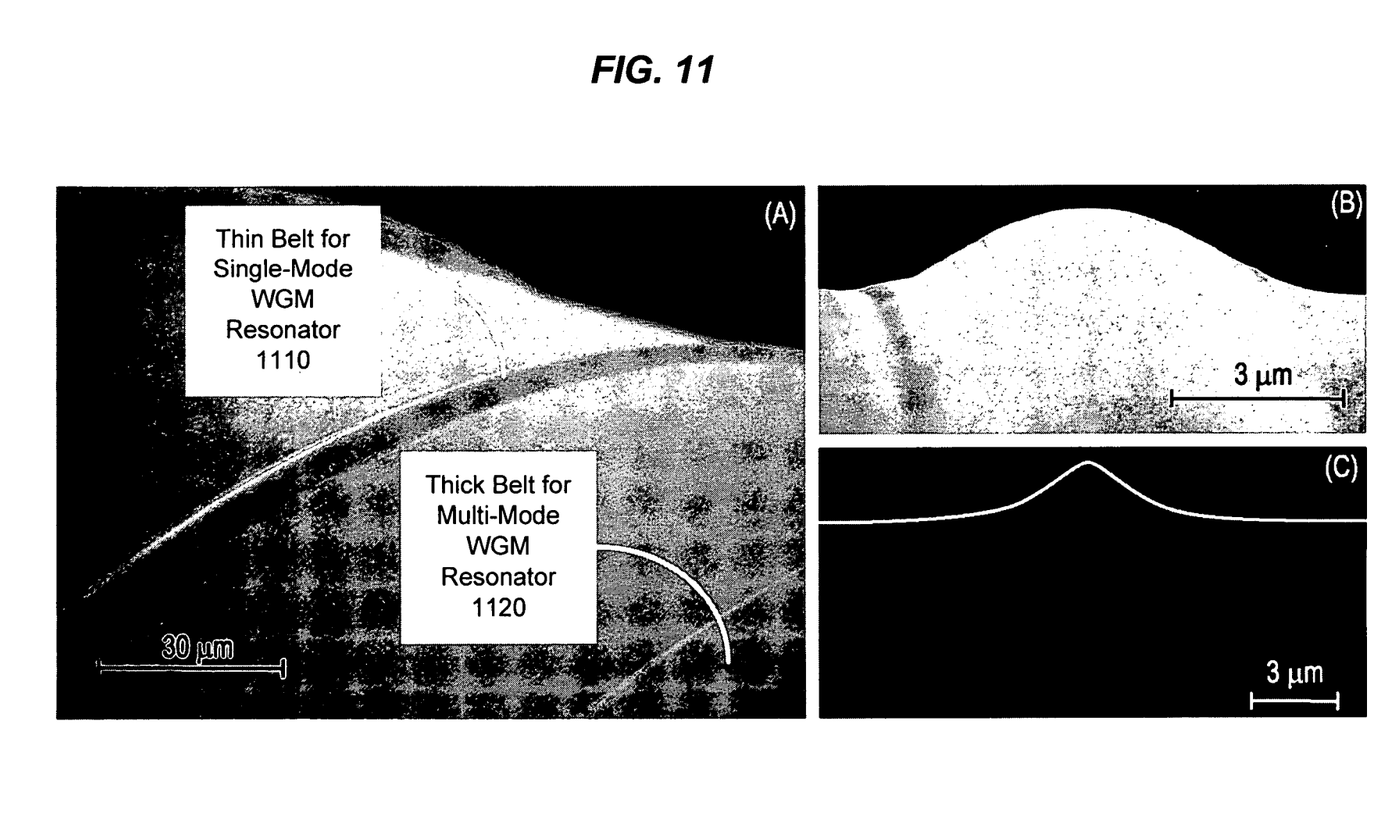
FIG. 11 shows examples of single mode and multimode WGM resonators formed on a rod with two different protruded belt regions.

A monocrystal fluorite rod of 5 mm in diameter was fabricated. WGMs in such a rod have extremely dense spectra. After a small ring-like protruded belt region with dimensions of the order of several microns was fabricated on the surface, the resonator spectrum changed drastically. Referring to FIG. 11, FIG. 11A shows the scanning electron microscope (SEM) image of the fluorite resonator formed on a fluorite rod. FIG. 11B shows a detailed SEM image of the protruded belt region in FIG. 10A. FIG. 11C shows the intensity map of the confined light in the single mode resonator simulated by numerical solution of the wave equation.

FIG. 11A shows two protruded belt regions are formed on the same fluorite rod where the top belt is a single mode WGM resonator 1110 and the bottom belt is a multimode WGM resonator 1020. Measurements from both resonators were obtained at the optical wavelength of 1550 nm.

Figure 12:
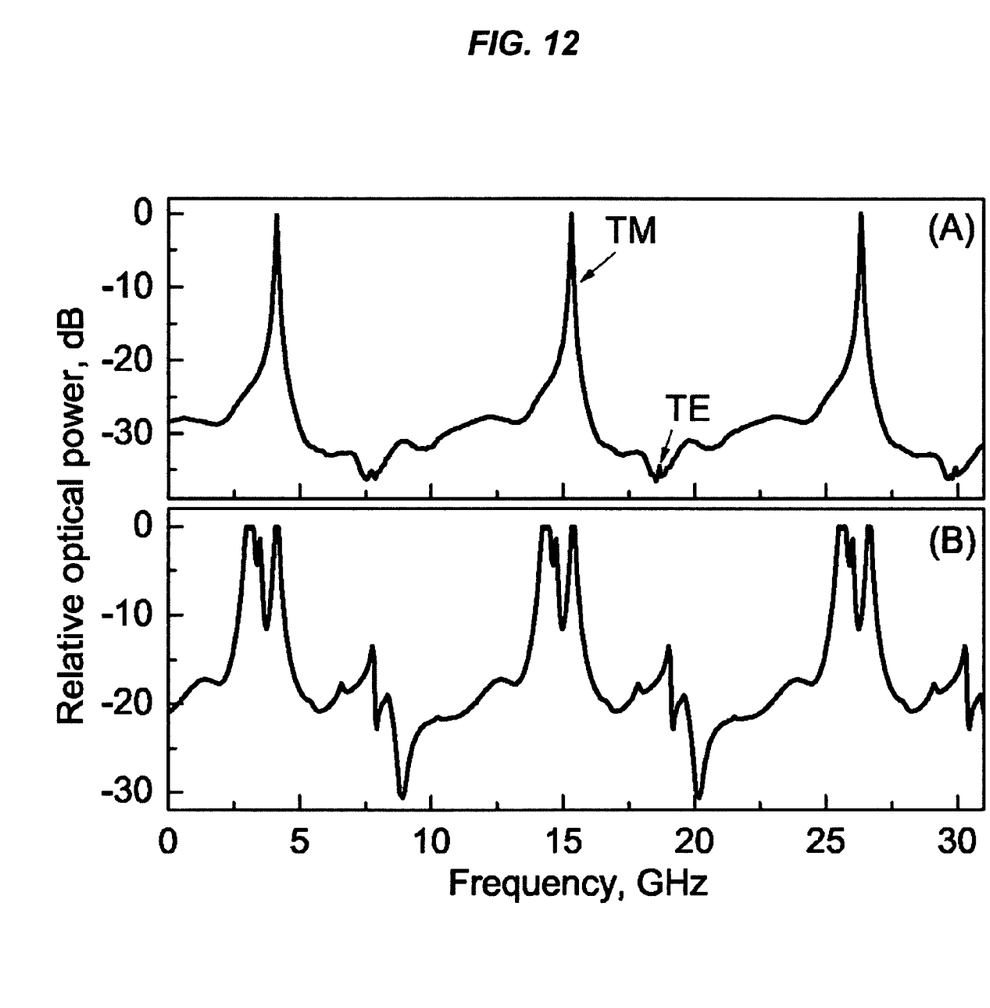
FIG. 12 shows measured spectra of the two WGM resonators in FIG. 11.

FIG. 12 shows the measured spectra of the two WGM resonators in FIG. 11A. FIG. 12A shows the measured spectrum of the single mode WGM resonator 1110 where the low-Q peaks in the background are caused by the modes of the drum itself. We used an angle polished fiber to couple light into the resonators. FIG. 12B shows the spectrum of the multimode WGM resonator 1120 under the same coupling condition. The measurements suggest that the coupling does not affect the observed mode structure.

The resonator 1110 has a single TE and a single TM mode families. A single TM mode family was selected by the polarization of incoming light in the measurement shown in FIG. 12A. We confirmed that this was a single mode resonator by i) making high-sensitivity logarithmic measurement of its spectrum, and ii) performing numerical simulation of its parameters which clearly demonstrated that only the fundamental modes survive. Q factors of both families of modes shown in FIG. 12A are on the order of $10^7$. The particular resonator's Q-factor was limited by residual surface roughness.

Figure 13A:
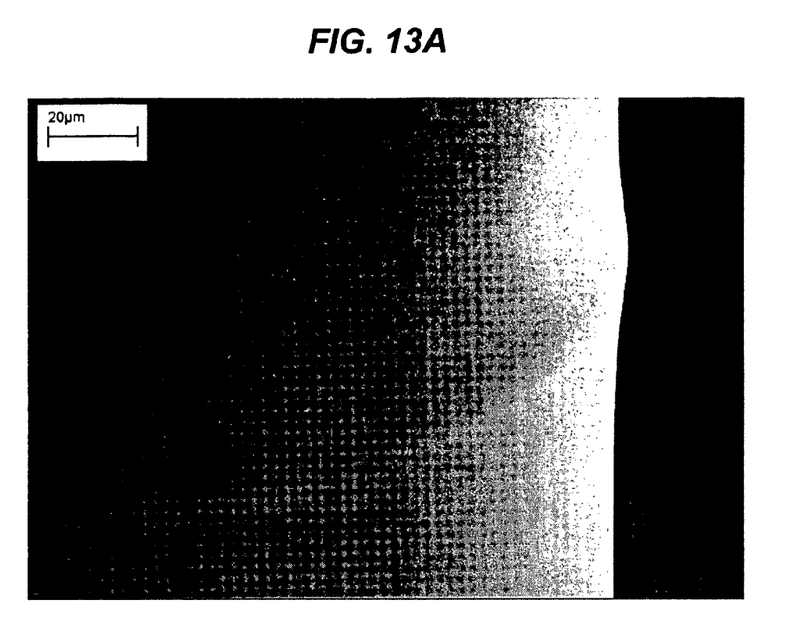
FIGS. 13A and 13B show another example of a single mode WGM resonator formed on a rod and the corresponding measured spectra.
Figure 13B:
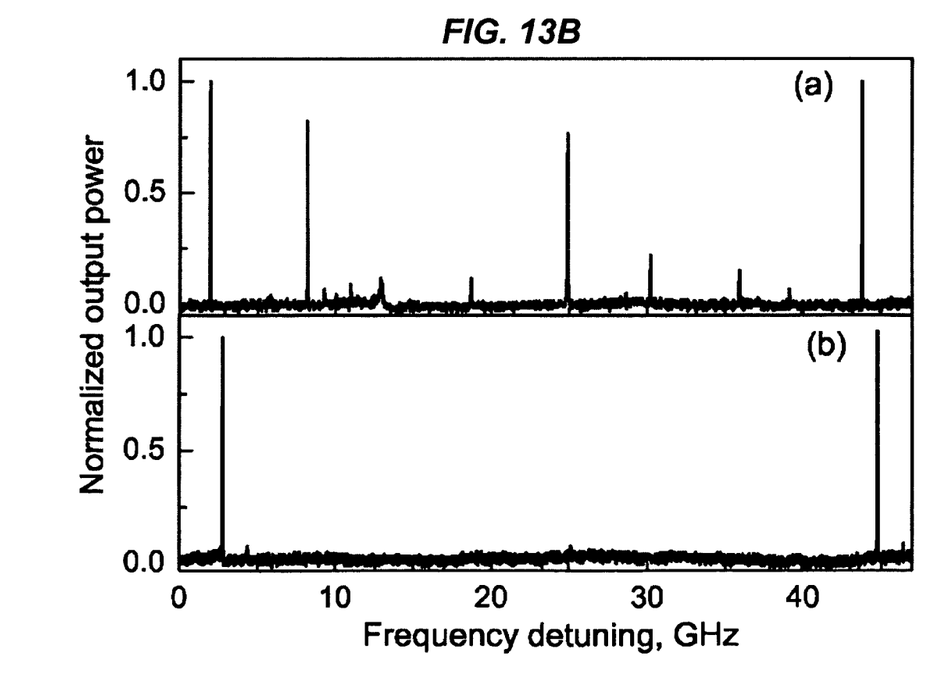

FIGS. 13A and 13B show another example of a single mode WGM resonator formed from a monocrystal fluorite rod of about 0.15 mm in diameter. A single mode WGM resonator was fabricated on the rod by forming a ring bump of several microns on the rod surface. FIG. 13B(a) shows the measured spectrum of the single mode WGM resonator shown in FIG. 13A when the belt was first formed. This is not an ideal single-mode spectrum. Next, the ring bump was further shaped and polished into a trapezoid cross section with a 19-micron base and a 6-micron top. The height of the ring bump along the symmetry axis of the rod is 6.6 microns. FIG. 13B(b) shows the measured spectrum of the finalized single-mode resonator. The Q factors in both measured spectra in FIG. 13B are above $2\times10^9$.

The present technique allows for fabrication of a single-mode optical WGM resonator of any size. For example, a resonator the size of an apple requires a ring with dimension of tens of microns for single mode propagation of one micron wavelength light. This is counter-intuitive because the size of the single-mode channel is much larger than the wavelength. For practical applications, small resonators are preferred for engineering of microcavity spectra and for integrated devices with microresonators.

The spectral behaviors of single mode WGM resonators described have are largely dictated by the geometry of the protruded belt region. Hence, such WGM resonators may be used for single mode operations for other electromagnetic waves outside the optical spectrum. For example, single mode WGM resonators for microwave signals may also be made based on the structural designs described in this application.

Only a few implementations are disclosed. However, it is understood that variations and enhancements may be made.

What is claimed is:

1. A device, comprising:
   a cylindrical rod of an optical material comprising a protruded belt region symmetric around a longitudinal axis of the cylindrical rod to form an optical resonator, wherein a height of the protruded belt region along the longitudinal axis is set to be sufficiently small so that the protruded belt region supports a single whispering gallery mode circulating around the protruded belt region, wherein the height and width of the protruded belt region are larger than one wavelength of light in the single whispering gallery mode.

2. The device as in claim 1, wherein the belt region has an exterior surface which is spherical.

3. The device as in claim 1, wherein the belt region has a non-spherical exterior surface which is part of a torus.

4. The device as in claim 1, wherein the cylindrical rod is made of lithium niobate and has a diameter of 8000 microns, and wherein the protruded belt region has a height of 5 microns and protrudes 9 microns from a cylindrical side surface of the cylindrical rod to support a single whispering gallery mode at an optical wavelength of 1550 nm.

5. The device as in claim 1, wherein the cylindrical rod is made of a fused silica material.

6. The device as in claim 1, wherein the cylindrical rod is made of a calcium fluoride material.

7. The device as in claim 1, wherein the cylindrical rod is made of a glass material.

8. The device as in claim 1, wherein the cylindrical rod is made of a lithium niobate material.

9. The device as in claim 1, wherein the height of the protruded belt region along the longitudinal axis is set to be greater than a first height threshold below which the protruded belt region does not support any whispering gallery mode, and less than a second height threshold above which the protruded belt region supports at least two whispering gallery modes.

10. The device as in claim 1, further comprising an optical coupler positioned relative to the protruded belt region to evanescently couple light.

11. A device, comprising:
    a whispering-gallery-mode resonator shaped symmetrically around a symmetry axis and having an equator in a circular cross section of the resonator that is perpendicular to the symmetry axis, wherein the resonator is shaped to comprise a protruded belt region at the equator and a height of the protruded belt region along the symmetry axis is set between a first height threshold and a second height threshold to support energy in a single whispering gallery mode and wherein the height and width of the protruded belt region are larger than one wavelength of light in the single whispering gallery mode, and wherein the protruded belt region does not support any whispering gallery mode when the height of the protruded belt region is less than the first height threshold, and the protruded belt region supports at least two whispering gallery modes when the height of the protruded belt region is greater than a second height threshold.

12. The device as in claim 11, wherein the resonator is made of an optical dielectric material.

13. The device as in claim 11, wherein the resonator is made of a calcium fluoride material.

14. The device as in claim 11, wherein the resonator is made of a lithium niobate material.

15. The device as in claim 11, wherein the resonator is made of a glass material.

16. The device as in claim 11, wherein the resonator is made of a fused silica material.

17. The device as in claim 11, wherein the belt region has an exterior surface which is spherical.

18. The device as in claim 11, wherein the belt region has a non-spherical exterior surface.

19. The device as in claim 11, wherein the belt region has an exterior surface that is part of a spheroid.

20. The device as in claim 11, further comprising an optical coupler to couple an electromagnetic wave signal into the single whispering gallery mode in the protruded belt region.

21. The device as in claim 11, wherein the energy is an optical signal.

22. The device as in claim 11, wherein the energy is a microwave signal.

* * * * *